United States Patent
Norwood et al.

(10) Patent No.: US 7,266,040 B2
(45) Date of Patent: Sep. 4, 2007

(54) ACTIVE SONAR SIMULATION

(75) Inventors: Ronald Frances Norwood, Oviedo, FL (US); Cathy Christensen Matthews, Oviedo, FL (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 11/203,574

(22) Filed: Aug. 10, 2005

(65) Prior Publication Data

US 2006/0039236 A1    Feb. 23, 2006

Related U.S. Application Data

(60) Provisional application No. 60/602,564, filed on Aug. 18, 2004.

(51) Int. Cl.
*G09B 9/56*    (2006.01)
(52) U.S. Cl. ........................................... 367/13
(58) Field of Classification Search ............... 367/13, 367/1; 434/6, 7, 8; 703/2, 6, 9
See application file for complete search history.

(56) References Cited

U.S. PATENT DOCUMENTS

| | | | | |
|---|---|---|---|---|
| 4,393,483 A | * | 7/1983 | Hammond et al. | 367/13 |
| 5,978,646 A | * | 11/1999 | Weinberg | 434/6 |
| 5,978,647 A | * | 11/1999 | Weinberg | 434/7 |
| 5,983,067 A | * | 11/1999 | Weinberg | 434/7 |
| 5,995,803 A | * | 11/1999 | Weinberg | 434/6 |
| 6,002,914 A | * | 12/1999 | Weinberg | 434/6 |
| 6,096,085 A | * | 8/2000 | Sammelman | 703/2 |
| 7,002,877 B2 | * | 2/2006 | Arvelo et al. | 367/13 |
| 7,187,619 B2 | * | 3/2007 | Arvelo et al. | 367/13 |
| 2006/0039236 A1 | * | 2/2006 | Norwood et al. | 367/13 |

* cited by examiner

*Primary Examiner*—Daniel Pihulic
(74) *Attorney, Agent, or Firm*—Eliot Abolafia

(57) ABSTRACT

An exemplary embodiment of the invention relates to a method and system for displaying simulated acoustically realistic active sonar signals. The method includes simulating a realistic sounding active sonar signal that originates from a simulated sonar transmitter. The simulated sonar signal is acted upon and modified by simulated ocean effects and is received by a simulated hydrophone. The sonar signal is acoustically displayed within a simulated ocean acoustic environment that incorporates realistic sounding simulated reverberation.

21 Claims, 6 Drawing Sheets

ACTIVE SONAR SIMULATION

CROSS-REFERENCE TO RELATED APPLICATIONS

This application claims the benefit of U.S. Provisional Application No. US60/602,564, filed 18 Aug. 2004.

STATEMENT REGARDING FEDERALLY SPONSORED RESEARCH OR DEVELOPMENT

Not Applicable

REFERENCE TO A SEQUENCE LISTING, A TABLE OR A COMPUTER PROGRAM LISTING APPENDIX SUBMITTED ON A COMPACT DISK

None

BACKGROUND OF THE INVENTION

1. Field of the Invention

This invention relates to the field of simulation and more particularly to the acoustical presentation of simulated active sonar return signals.

2. Description of the Related Art

Active sonar provides a means for detecting and tracking submerged or surfaced contacts. Contacts are defined as reflective surfaces of interest (either physical surfaces or conditions having the reflective properties of physical surfaces). which reflect Sound propagated by a sonar emitter. The active sonar emits a pulse of acoustic energy into the water. In active detection, pulses of acoustic energy generated by the sonar are propagated through the water to the contact. Reflected from the contact, these pulses of acoustic energy travel back to a receiver. Range information is obtained by electronic circuitry that measures the time interval between transmitted and received pulses.

Typically, full physical models are used for high fidelity simulation of underwater passive emanations and active sonar signal reflections and the associated reverberation. Reverberation is a characteristic of underwater sound transmission caused by the environmental and physical characteristics and environment of the sea, the sea bottom, sea volume characteristics, and the sea surface that bound transmission. Reverberation introduces a noisier background environment that may mask the signals of interest reflected from the contacts.

The full physical reverberation modeling approaches used in the prior art are computationally intensive. Modeling reverberation typically requires one or more computers, each having the capacity for substantial central processor unit (CPU) cycles. The large processing requirement results because transmission loss calculations are required to be performed for all the directions that each acoustic transmitter emits. Each transmission loss calculation is modeled along a non-linear (ray path) radial from the emitter, and the transmission loss calculation requires many of these radials for the horizontal emission, and further requires the same number of radials to angle up and down at numerous intervals to get the full effect of the reverberation. This results in many returns that travel many different paths that may include surface and bottom reflections, and requires having to perform numerous transmission loss calculations to simulate the signal paths with high fidelity. High fidelity is a very important attribute to train sonar operators because the operators quickly learn to recognize repetitious environments that are not tied to changing simulated conditions.

When simulating a real environment with the full physical modeling approach, transmission loss calculations for all tactical areas become extensive. The extensive computational requirements render the CPU's unable to process results in real-time, unless enormous CPU resources are made available. In the context of real-time, the intent is that the computational resources must be able to simulate, in the virtual environment, contacts and tactical sensor and processing components quickly enough to provide realistic cause and effect situations to the trainee.

These computations are so extensive for obtaining real-time high fidelity results that obtaining real-time high fidelity results becomes cost prohibitive and, simulation fidelity is compromised because of limited hardware capabilities or availability. Therefore, there is a need to eliminate high CPU processing requirements for underwater acoustic active simulation, thereby allowing cost effective hardware solutions to perform real-time underwater active acoustic simulation.

BRIEF SUMMARY OF THE INVENTION

Figure 1:
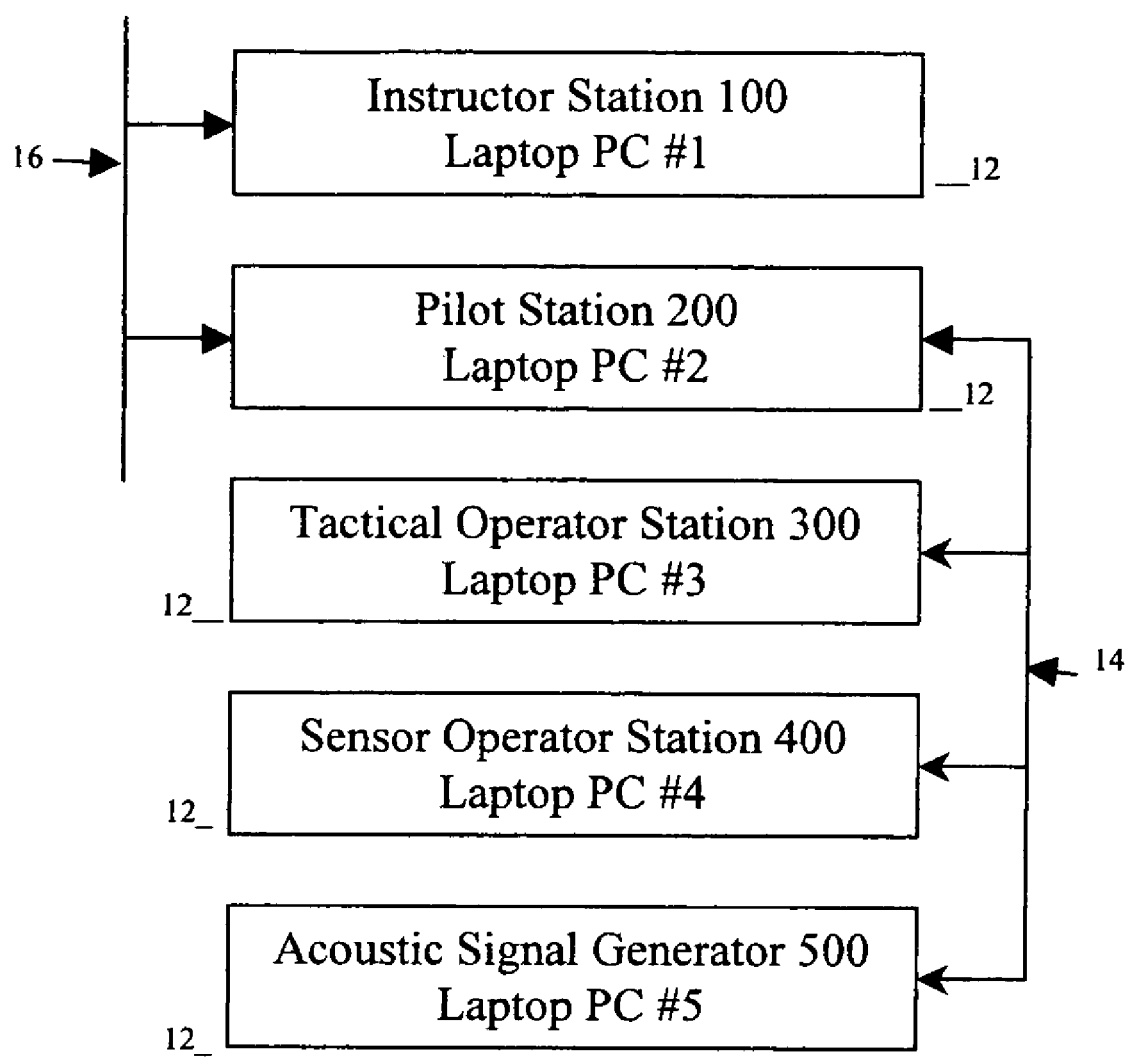
FIG. 1 is an exemplary embodiment of a system embodying an active sonar simulation.

It is an object of the invention to produce an active sonar simulation.

It is another object of the invention to produce a sonar simulation with efficient utilization of computer resources by using fewer CPU processing cycles than required by using full physical models.

It is a further object of the invention to produce a cost effective sonar simulation.

A method in a data processing system simulates a realistic sounding active sonar signal that originates from a simulated sonar transmitter. The simulated sonar signal is acted upon and modified by simulated ocean effects and then is received by a simulated hydrophone. The sonar signal is acoustically displayed within a simulated ocean acoustic environment that incorporates realistic sounding simulated reverberation. The method comprises creating an ocean physical data file for storing ocean physical data, creating a noise file for storing the acoustic signatures of the ocean environment, retrieving random samples from the noise file, filtering the random samples retrieved from the noise file, retrieving physical data from the ocean physical data file for calculating reverberation, calculating reverberation decay using inputs from the physical data file, modifying the random samples retrieved from the noise file with the calculated reverberation decay, mixing the modified random samples to create a realistic reverberation emulation, defining distance data, velocity data, aspect pattern data and strength data for contacts of interest, defining data for sonar platform location and velocity, selecting a base signal frequency, selecting a sonar transmission frequency, initiating a simulated transmission of a sonar transmission signal at the sonar transmission frequency, calculating a doppler shift for the contacts at the sonar transmission frequency using inputs of the data for the contacts of interest and the data for sonar platform location and velocity, correcting the base signal frequency for doppler shift, correcting the base signal for propagation loss, calculating time of return for the base signal, the time of return being equal to the time of return of the simulated transmission signal at the sonar transmission frequency, mixing the base signal with the reverberation emulation signal, and outputting the mixed signal.

A data processing system for simulating reverberation in a section of the ocean comprises, a personal computer having a means of sound output, an output device comprising a speaker for receiving for receiving output from the sound output means, and a means for producing a simulated reverberation signal having, a noise value from 650 to 950 Hz, an 800 Hz signal, a low frequency reverberation source set of components between 785 to 800 Hz, and a hi frequency reverberation source of components between 800 and 815 Hz.

These and other objects and advantages of the present invention will become apparent from the following description of the accompanying drawings, which disclose several embodiments of the invention. It is to be understood that the drawings are to be used for the purposes of illustration only and not as a definition of the invention.

DETAILED DESCRIPTION OF THE INVENTION

Referring to FIG. 1, an embodiment of a computer system for implementing one aspect of an active sonar simulation is shown generally at 10. By way of illustration and not by way of limitation, the computer system includes two or more personal computers (PC's) 12 along with multiple screens (not shown) and a speaker (not shown) for simulating and displaying an integrated training scenario, in particular a tactical situation. The displays depict landscapes, seascapes, instrumentation and controls, outside views and other information selectable for the simulation of equipment, environment, and decision-making. As is well known in the art, the entire simulation may reside on a single computer having sufficient memory and processing capability. When residing on two or more personal computers, the computers communicate extensively, preferably through an open architecture and shared protocol as is required by the frequent updating and transfer of information and calculations. The computers are connected to one another through an internal network 14 or, maybe connected through an external network 16 or, through a combination of both an internal and an external network.

Figure 2:
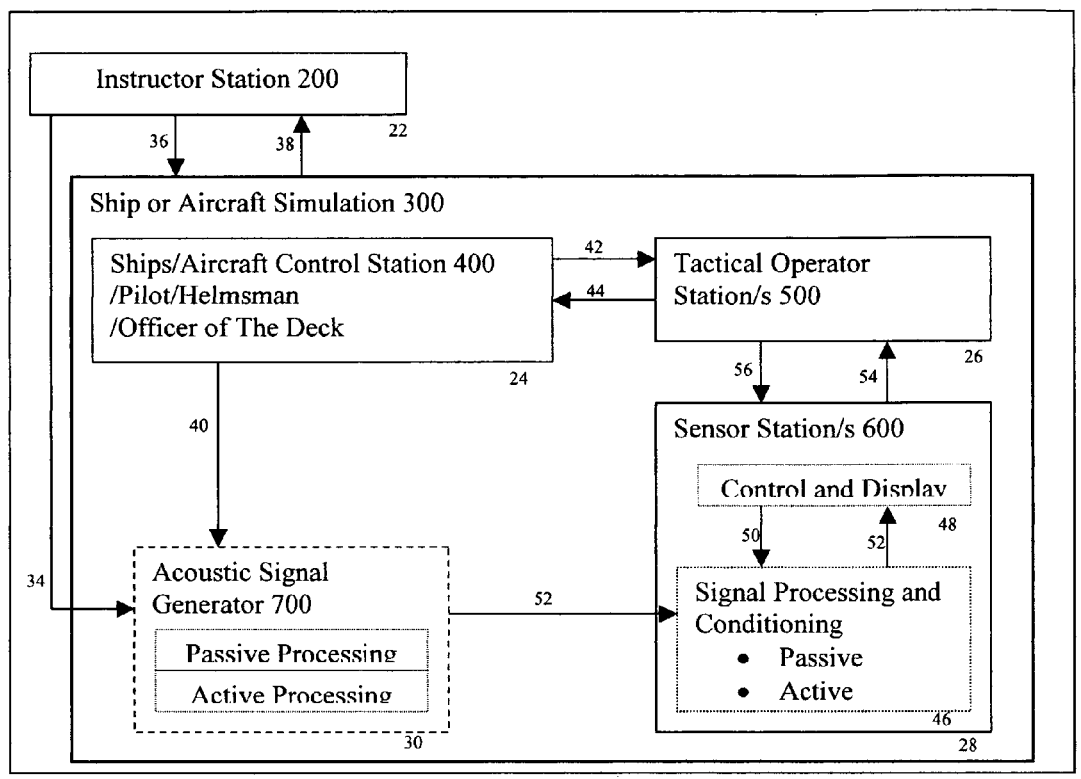
FIG. 2 is a block diagram of simulator having an active sonar simulation system according to one embodiment of the present invention.

Referring to FIG. 2 an exemplary simulator system for training with functional relationships is depicted generally at 20. The simulator consists of five networked laptop PC's consisting of an instructor station PC 22, a ship control laptop PC 24, a tactical operator station laptop PC 26, a sensor operator station laptop PC 28, and an acoustic signal generator laptop PC 30.

The instructor station PC 22 generates system control signals for controlling the overall simulation. The instructor station provides acoustic contact and target generation control signals 34 to the acoustic signal generator PC 30 and system control signals 36 to all other networked PC's in the simulation. Data from the simulation 38 is transferred to the instructor station in the form of display information.

The ship control laptop PC 24 interfaces with the acoustic signal generator laptop PC 30 and the tactical operator laptop PC 26. The ship control laptop PC provides control signals 40 to the acoustic signal generator laptop PC for platform characteristics such as location, velocity and noise level. The ship control laptop PC provides data 42 to the tactical operator station laptop PC consisting of platform contact and target information. The tactical operator station PC provides data 44 for tactical feedback for contact tracking and weapons control to the ship control laptop PC.

The sensor station laptop PC 28 communicates directly with the tactical operator station laptop PC 26 and the acoustic signal generator laptop PC 30. The sensor station laptop PC provides the signal processing and conditioning 46 for the active and passive sonar simulations and controls and displays the data 48 including acoustic data. A signal-processing request 50 to the acoustic signal generator initiates the transmission of time series data 52 for active and passive sonar acoustic profiles. The sensor station laptop PC transmits data 54 consisting of sensor input signals to the tactical operator station laptop PC and receives data 56 consisting of platform control and tactical feedback from the tactical operator laptop PC.

Tactical training scenarios include positions for individual stations and may include simulations of aircraft and ships within an area of the earth's oceans and seas. In the illustrated embodiment, at least one aspect of one computer is dedicated to modeling active sonar aboard a platform. The platform may be either a ship platform or an aircraft platform typically equipped with sonobuoys that transmit and receive sound.

In the illustrated embodiment, the computer upon which the active sonar simulation resides is a typical, commercially available PC, preferably a laptop PC, capable of running software embodied on computer storage media and implementing the sonar simulation software to be described hereinafter. In the exemplary embodiment each personal computer (PC) is operated with a Windows 98 or higher operating system although other operating systems may be used, for example an open source operating system such as a Linux based operating system. In the exemplary embodiment for simulating the realistic active sonar signal the PC has at least 1 GB of RAM and a 120 MHz micrprocessor, or equivalent, for example a PENTIUM®, manufactured by Intel Corporation of Santa Clara, Calif., although the invention will run on other platforms, which will produce differences in performance. A CDROM drive or equivalent means, for example, an external memory device or Internet download capability is required for software installation. As is well known, the PC contains a media memory device such as a hard disk, accessible random access memory, a microprocessor and input and output devices (I/O's) such as speakers, microphones, keyboards, printers and visual displays. The computer includes a sound card, preferably a high fidelity sound card for outputting acoustic signals to the speaker. To accept the software and databases, the memory device, for example the hard disk, preferably should have a capacity of at least 10 MB free hard drive space for program operation and data storage. However, the memory requirement may vary, and depends upon the expected size of the database. As is well known in the art, memory can be selected to match the database or increased by installing a higher capacity disk drive.

In the illustrated embodiment, the invention is implemented in the C++ programming language using object-oriented programming techniques. C++ is a compiled language, that is, programs are written in a human-readable script and this script is then provided to another program denominated a compiler, which generates a machine-readable binary code that can be loaded into, and directly executed by a computer. However, the invention is capable of implementation in other software code as is well known.

Figure 3:
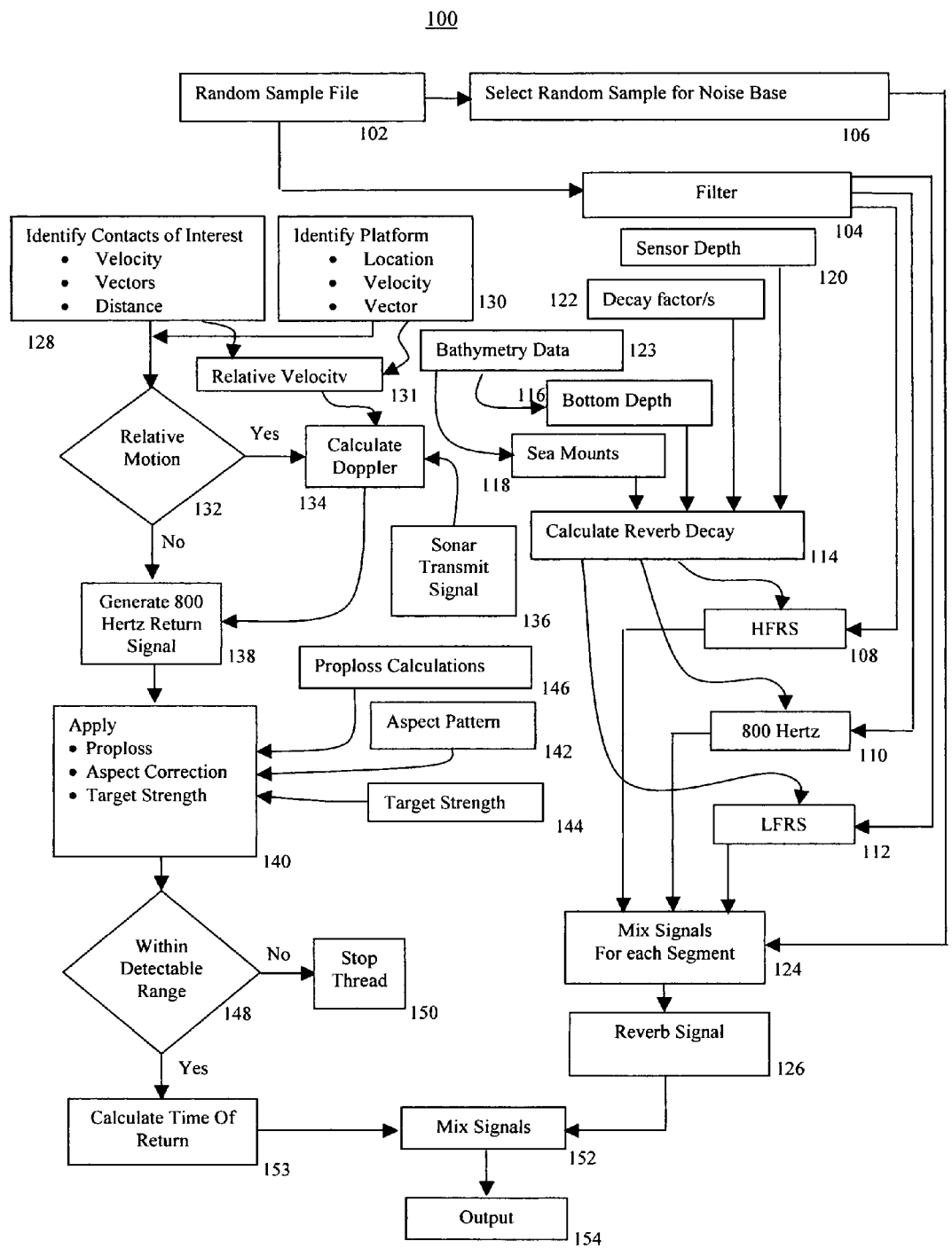
FIG. 3 is a FLOW diagram of one embodiment of the invention.

Referring to FIG. 3, a flow diagram of one embodiment of the invention is shown generally at 100. There are three elements illustrated for the fidelity requirements of Active Sonar Signal Return Processing. They are: reverberation emulation, active sonar transmission signal processing, and return signal mixing in the reverberation field.

Reverberation Emulation

A random noise sample file 102 provides an acoustic definition for the sonar emitter and receiver in the environment defined in the scenario. The noise file is defined from mimicking the background noise typically detected in the ocean. Typically, the dominant noise is associated with the sea state and emulates the noise caused by atmospheric wind flowing over the water. In the present embodiment, the sea state is a constant value generally emulative of the ocean although it is contemplated that a variable seastate is within the scope of the present invention. The variable seastate could be contemporaneously selectable by an instructor or alternatively could be defined by the program from exogenous variables that include wind speed, time-of-year, geographical location of the platform and contacts, or other well-known parameters. In addition to sea state noise, thermal noise and shaping noise (nondirectional) also comprise random noise in the actual ocean environment and it is within the contemplation of the present invention to incorporate these noises into the emulation.

In the exemplary embodiment, the noise file is derived from a basic wave file, RIFF.Wav constructed from a utility such as GOLDWAVE™. Files for an 800 Hz, High Frequency Reverberation Source (HFRS), and a Low Frequency Return Source (LFRS), as will be described hereinbelow are concurrently derived from the basic wave file.

A blank wave file, RIFF.Wav is generated using a sample rate of 8192. The sample rate of 8192 corresponds to a sample rate used by the signal-processing rate of the particular simulator. As is well known in the art, RIFF.Wav is the standard Microsoft™ format for sound files. In the exemplary embodiment, acoustic file generation software, for example GOLDWAVE™ is used to generate the file RIFF.Wav. GOLDWAVE™ has an expression evaluator that generates time series data from formulae provided the operator. Here, the Blank RIFF file is populated with White Noise using the formula: Sample*Random Number. GOLDWAVE™ automatically formats the random number to fit the component samples of the RIFF format. The white noise from the noise file is either filtered 104 as described hereinbelow or randomly sampled 106. The random sample of the noise base provides white noise emulation between and including 650 Hz and 950 Hz.

The noise is filtered 104 to define each of a high frequency reverberation source 108, an 800 Hz source 110, and a low frequency reverberation source 112 to achieve the desired output using the GOLDWAVE filter function. The following are the settings for each file type in the illustrated embodiment:

LFRS=>785 and <801

HFRS=>800 and <815

800=>795 and <805

Each file is saved and is utilized by the application software of the illustrated embodiment for a particular purpose, as will be described hereinbelow to emulate reverberation.

The reverberation decay component 114 is the most computationally intensive piece of the emulation. Reverberation includes the combined sound of many small echoes returned to the hydrophone due to scattering from the ocean surface (surface reverberation), from the bottom (bottom reverberation), and/or from the scattering in the water mass (volume reverberation). Examples of sources of volume reverberation are air bubbles and suspended solid matter. The techniques presented here eliminate the high end computational requirements yet still provide a high level of realism, when the active sonar simulation is either background noise limited or reverberation limited.

There are two types of reverberation components: Continuous Wave (CW) and Frequency Modulation (FM). The CW type of active transmission creates a rich environment for reverberation. The FM type of transmission has little if any reverberation due to the sliding or pulse step transmissions. It is to be appreciated that the greatest advantage from the present embodiment is realized with the CW type of transmission.

When the reverberation is created through summation, the effects of constructive and destructive interference produce a high fidelity simulation. The reverberation decay emulates time-delayed returns from the patterns resulting from combined echoes that originate at different distances.

In the illustrated embodiment, the reverberation is emulated using inputs from bottom depth 116, sensor depth 120 and reverberation decay factors 122. Rapid changes in bottom depth reflecting seamounts are not accounted for separately in the present embodiment. Modeling of seamounts 118, as separate entities, is within the contemplation of the present invention since seamounts are simply defined in parameters resulting from rapid changes in bottom depth.

Within the calculation of reverberation decay 114, reverberation decay factors are used to calculate the reverberation amplitudes for the simulated conditions of bottom depth 116, including seamounts. It is within the further contemplation of the present invention that the reverberation factors will be used to calculate the reverberation amplitudes for the effects of surface reflections from sensor depth 120. The reverberation decay factors are specifically applied to the physical contours of the ocean bottom. The distance from a datum to the bottom depth and the seamounts is determined from actual bathescope data for the region of the ocean. The bathescope data is saved in a database 123 accessible to the simulation computer program. The time that the simulated reverberation reaches the sonar transducer from the sea bottom, which includes the seamounts, is calculated from data identifying platform location, velocity 130 and bottom depth/seamount location. In addition, the regional properties of the ocean are also capable of being saved in the database for access by the simulation computer program, for simulating the physics of the reverberation. In the present embodiment, the specific reverberation decay factors are selected to represent the objectives of the simulation, for example, a high reverberation environment, a medium reverberation environment or a low reverberation environment.

The reverberation decay factors are applied to the high frequency reverberation source 108, the low frequency reverberation source 112, and the 800 Hz source 110 at each depth and mixed 124 with the random noise 106 to produce an acoustic reverberation signal 126 thereby producing an accurate time referenced signal that produces accurate amplitudes and interference patterns.

Upon the request for an active sonar transmission by the sonar operator, a thread is spun to modify the ping settings using functions from the exogenous inputs comprising pulse length factor, bottom factor, bottom length factor, bottom depth, and the center frequency. The depth will return a reverberation set of values equal to Depth*4800/3*2, where 4800 is the speed of sound and 3 is the conversion to meters.

The present embodiment utilizes either a cosine decay (cosine decay and quadrature decay are used interchangeably) factor as described hereinbelow, or an ocean environment specific algorithm. There are several well-known oceanographic based models that can be used to model the decay factor. Although other well-known algorithms for decay, for example exponential decay, can be used, the cosine decay produces an emulation that requires the use of modest computer resources and results in acceptable fidelity. The reason cosine decay provides excellent fidelity to the actual ocean environment is that the effect of reflections from the bottom and the seamounts result in slower decay than would be modeled, for example, in a purely exponential decay.

In the cosine decay algorithm, the ping settings are used to generate a reverberation envelope factor data buffer for setting the reverberation amplitude. The length and time, in degrees ranging from 0 deg. to 90 deg., of the ping pulse is transformed to a cosine function for calculating time.

Using inputs of bottom depth, and sensor depth/seamounts, the decay algorithms determine propagation loss data to emulate the reverberation level at the hydrophone. As explained hereinabove, it is to be appreciated that it is within the contemplation of the present invention to include surface returns to produce the combined reverberation signal.

The elapsed time is defined as the sample number divided by the sample rate and is measured in degrees starting from the end of the pulse to a time determined by the pulse length factor. Once the timeframes are determined, the following algorithm expressed in source code determines the decay function:

Fdecay Value = (float)(cos((double)(fTimeDegrees*
DEGREES_TO_RADIANS)));

pReberbEnveopeBuffer[I] = (signed short)(fDecay Value*50)

Using the cosine function to calculate the decay provides a quadrature decay that holds the reverberation similar to actual signals.

The reverberation signal 126 is a set of time series signals. The output time series signal is comprised of noise values from 650 to 950 hertz (background noise), a reverberation signal typically at 800 Hz, a Low Frequency Reverberation Source (LFRS) set of components between 785 to 800 Hz, and a set of Hi Frequency Reverberation Source (HFRS) set of components between 800 and 815 Hz. The 800 Hz background noise signal, is initially the strongest signal because most items in the ocean do not move. The noise values represent the background noise present in all ocean areas. The LFRS and HFRS set of values represent the Doppler components for random returns for the active sonar field. These two components provide the Doppler effects for a reflected object with a speed component from 0 to + or ~30 Knots. Since tactical Doppler returns are dependent on many random variables this methodology provides a high level of realism without sacrificing computational time. In the present embodiment the decay envelope is a fixed value. However, it is within the contemplation of the present invention to vary the decay envelope as the simulated ocean conditions change dynamically.

Active Sonar Transmission Signal Processing

Contacts of interest are identified with distance and velocity vectors 128. Contacts include objects such as surface ships, submarines and sea creatures that inhabit the ocean environment and that produce return echoes from signals received from the active sonar transmitter. In maritime and naval training, contacts of interest are generally surface ships, waterborne weapons, natural obstructions and submarines. The noise signature radiating from contacts is capable of detection from passive sonar systems but often the background noise will mask the passive signals. In the active sonar environment the background noise signature is many magnitudes less than the active sonar return from the aforementioned contacts because of the magnitude of the reflected acoustic energy.

The calculated relative velocity vectors 131 between the contacts of interest 128, defined within the simulation, and the simulated active sonar transmitter and receiver, typically located on the simulated platform, or associated simulated sonobuoy 130 are also defined within the simulation. The relative velocity vectors 131 are compared 132 to calculate the Doppler correction 134 for relative motion between the contact of interest and the sonar transmitter and receiver. Relative motion between the contacts of interest and the active sonar transmitter and receiver affects the frequency of the active sonar signal causing a Doppler shift as is well known in the art.

The calculation of the Doppler shift 134 is performed by retrieving the velocity definitions and then applying the Doppler shift equation at the transmission frequency of the sonar transmitter. In the exemplary embodiment, for sonobuoy platforms, the frequency is typically from 6.5 KHz to 9.5 KHz and generally varies in 1000 Hz steps. It is to be recognized that other frequencies within and outside the sonobuoy range are in current use, and the invention can be implemented at frequencies other than the aforementioned frequencies described for the sonobuoy range.

Generation of a simulated sonar transmission signal 136 at the transmission frequency provides the pulse of energy that will be propagated through the water that is corrected for Doppler 134. Applying the appropriate frequency, the Doppler shift is calculated by the well-known Doppler Formula:

$$\Delta Frequency = 2*(V/C)*F$$

Where:
V=Relative velocity in the line of sight or Range Rate between Target and Receiver (Yards per second=1 Knot/~2000 Yards per hour)
C=Velocity of Sound (Same unit as V, 4900 feet per second or 5,880,000 Yards per hour for water)
F=Frequency of transmission in Kilohertz After the Doppler shift is calculated, it is translated from the transmission frequency to the base frequency, by maintaining the frequency shift differential along with amplifying the strength of the signal, and then adding the result to the Base frequency, 138. The translation results in a realistic Doppler shift in the aural range of the sonar operator. When applied to the base frequency, the information carried by the Doppler shift of the transmission and return frequencies is transmitted to the sonar operator by variance in the Base frequency. Maintaining the Doppler frequency shift differential and applying the shift differential to the aural frequency that is output to the operator results in a realistic simulated contact return signal.

The base frequency is the selected frequency that is received by the sonar operator from sonar equipment in actual operation. It is the frequency that an operator working from data in the real ocean listens to when receiving the sonar transmission. In the illustrated embodiment this signal will be generated at a Base frequency from 600 Hz to 1000 Hz and is preferably equal to a frequency of 800 Hz. The frequency range, and the preference of 800 Hz was determined after extensive experimentation for obtaining optimal results from United States Navy Sonar Operators. The Base signal is of the same pulse length (i.e., duration) as the original transmit signal.

After the Doppler correction is applied to the base frequency 138, then propagation loss 140 is applied to the signal. In the monostatic condition, the transmitter and receiver are co-located. The propagation loss in the monostatic case is the loss that would be encountered along the path from the location of the transmitter emitting the sonar signal to the contact of interest reflecting the signal and the subsequent return path to the hydrophone. The impact of the signal on the contact (reflector) actually enhances the signal before the return path back to the sensor. This is defined as contact target strength.

The strength of the signal undergoing propagation loss takes into account the aspect pattern of the target 142, target strength based upon the contact 144, and the energy decay along the path 146. In addition, the source signal will not be reflected from a contact that is out of the detectable range 148, and the thread for the active sonar return is stopped 150.

Propagation loss is a decrease in the energy level of the signal along the path to the contact plus its return to the sensing hydrophone. In the exemplary embodiment, propagation loss decay is represented by quadrature decay. The following algorithm represents quadrature decay as used in the exemplary embodiment:

Decay Value=Cosine(Time_in_Degree*90/Factor)

Where:
Time in Degree=Time of the Sample (Greater than Pulse Length Time)*90
Factor=A number applied to account for the differences between the Decay for Initial Ping (Volume Reverb) and Bottom Returns (Bottom Reverb)
Where Time of Sample must be within the following range
Time >Pulse Length <Degree Representation <=90

It is also within the contemplation of the present invention to model decay with other well-known models including oceanographic models. For example, and not by way of limitation, a model may be contemplated embodying exponential decay, $A=A_o \ln(e^{(-t/\tau)})$.

Where:
$A_o$=Signal Strength at the Sonar Transmitter
A=Signal Strength at any given time
e=Natural Logarithm
t=Time
$\tau$=1/decay constant for the sea conditions If the contact is within detectable range 148, the time of return to the sonar hydrophone is calculated 153 using the exogenous variables for distance between the contact and the hydrophone.

Return Signal Mixing

The reverberation emulation signal 126 and the reflected and attenuated base signal are mixed 152 at the calculated time of return 153. The duration and magnitude of the simulated active sonar signal within the simulated reverberation envelope is acoustically output 154 thereby providing a realistic active sonar simulation.

The results typical of the active sonar simulation will now be described by referring to FIGS. 4-8, wherein signals from the illustrated embodiment are provided for appreciation of the invention during operation.

The background noise component is simulated using a time series signal from 650 Hertz to 950 Hertz (not shown) representing the Ocean and other ambient noise is created by generating a white noise signal from 0 to 1000 Hz and band-pass filtering to the desired frequency of 650 to 950 Hz.

Figure 4:
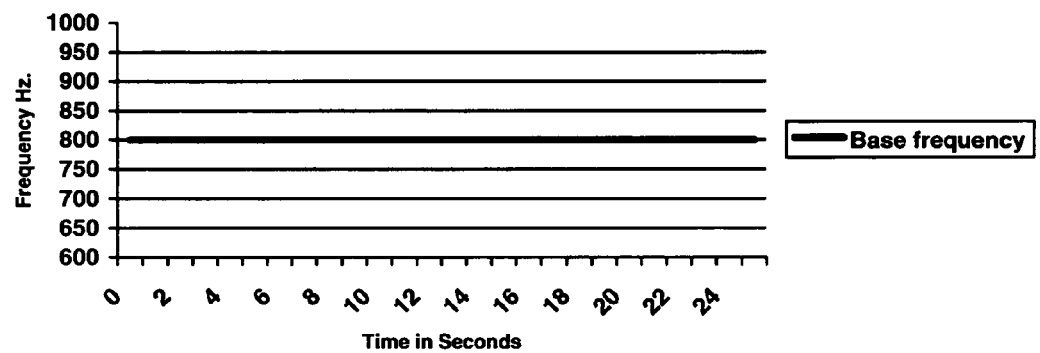
FIG. 4 is an 800 Hz. signal that is generated as a base frequency for Continuous Wave type transmission pulses.

Referring to FIG. 4, the 800 Hz reverberation signal is shown as a base frequency for the CW type transmission pulses. This series duration lasts for the entire receive cycle of the active transmission.

The LFRS time series (not shown) is created by generation of white noise in the frequency spectrum from 0 to 1000 Hertz. The noise is then band filtered for a signal from 785 Hertz to 800 Hertz with a steepness of 20 DB per Octave. This creates a very sharp cutoff. The residual components create the low frequency of opening components of the Doppler signal when mixed with the overall noise component.

The HFRS time series (not shown) is created by generation of white noise in the frequency spectrum from 0 to 1000 Hertz. The noise is then band filtered for a signal from 800 Hertz to 815 Hertz with a steepness of 20 DB per Octave. This creates a very sharp cutoff. The residual components create the high frequency of closing components of the Doppler signal when mixed with the overall noise component.

Figure 5:
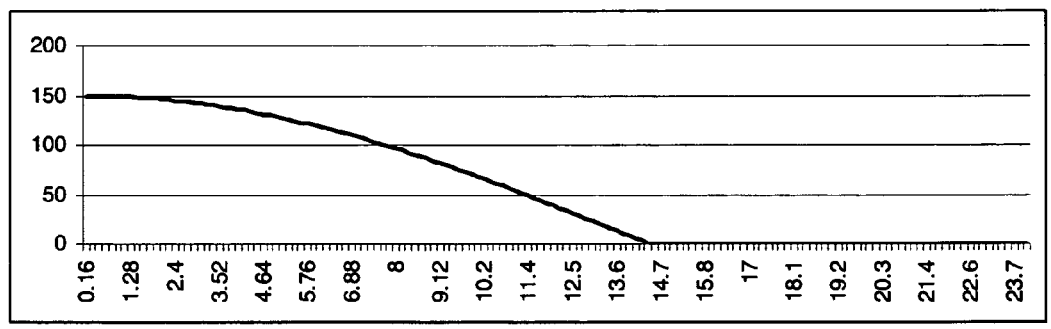
FIG. 5 is an example of a Long Pulse Length Decay Envelope.
Figure 6:
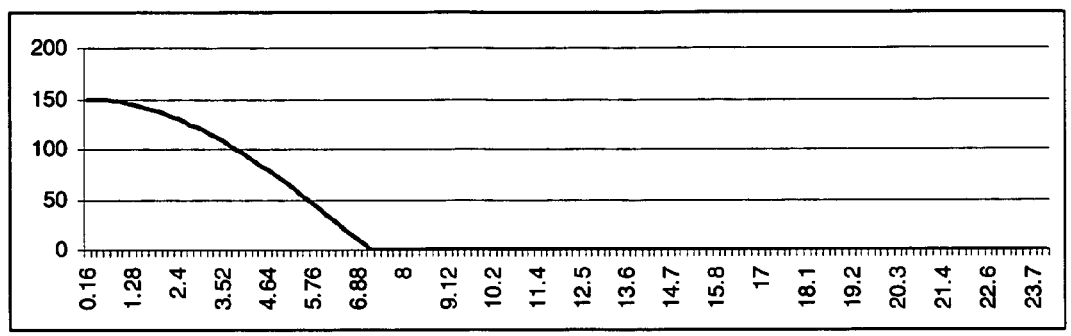
FIG. 6 is an example of a Short Pulse Length Decay Envelope.
Figure 7:
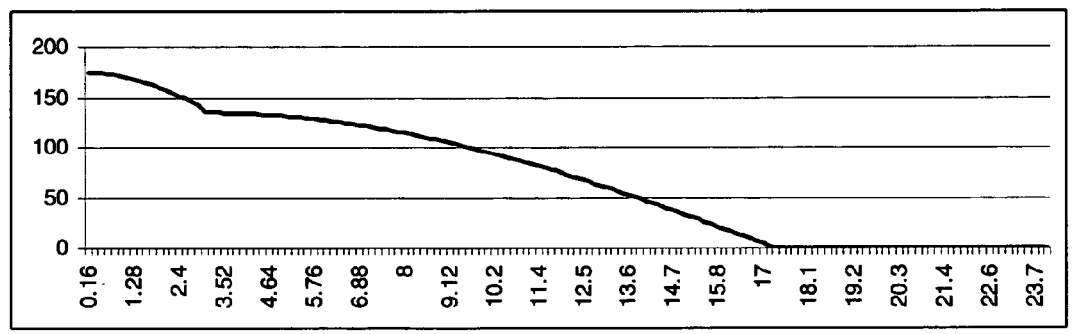
FIG. 7 is an example of a short pulse decay envelope with the bottom decay added.

Referring to FIGS. 5, 6, 7 several possible sonar signals are shown. FIG. 5 is an example of a Long Pulse Length Decay Envelope. FIG. 6 is an example of a Short Pulse Length Decay Envelope. FIG. 7 is an example of a short pulse decay envelope with the bottom decay added.

Figure 8:
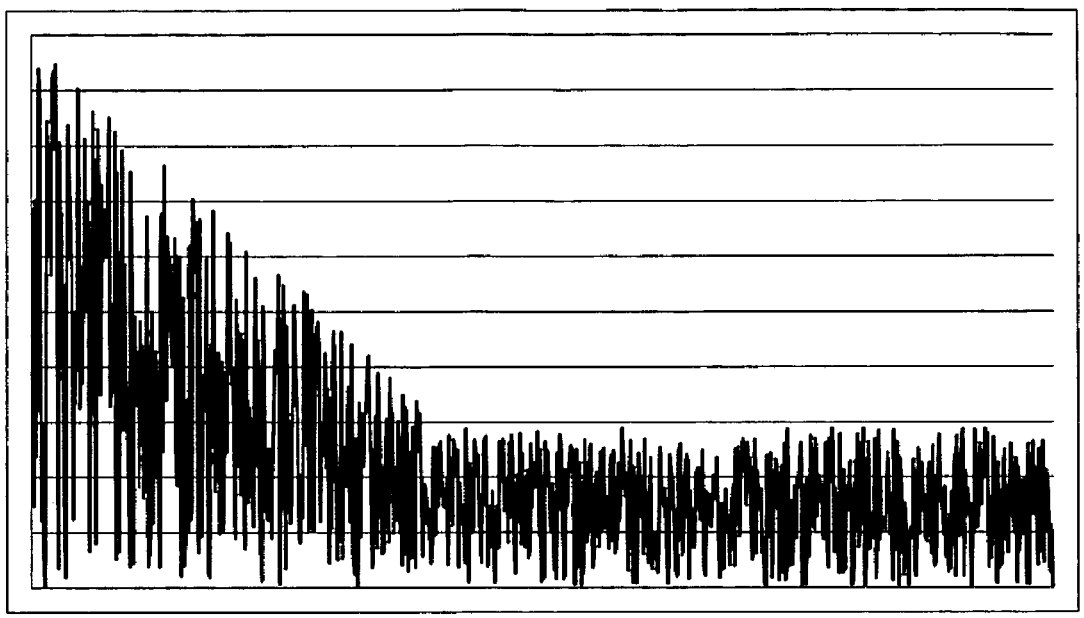
FIG. 8 is an example of the combination of the individual signals resulting in emulated reverberation.

Referring to FIG. 8 an exemplary output of the signal mixing, factoring in background noise and the decaying reverberation effect is shown. The mixing of the background noise, LFRS and HFRS signals in a straightforward method will not directly yield the reverberation components found in the actual Ocean environment. The simulation accounts for the decay characteristics of the different pulse lengths, the surface and bottom reflections, including the reflections of seamounts, and other active non-target reflections. Note the signal for the reverb jumps at about 1/10 the scale thereby emulating the effect from the bottom interaction.

After the reverberation return signal is emulated, it is mixed with the active return signal at the time of return. The composite signal is provided in acoustic output data to the operator through earphones or speakers.

As can be appreciated by those skilled in the art of sonar simulation, the computer resources required to produce high fidelity reverberation are greatly reduced and can be accomplished on laptop PC systems. In particular, the use of the invention for the training of sonar operators, for the production of video games for the gaming industry and for use in the motion picture industry to produce realistic sonar simulations and emulations is within the scope of the present invention.

As can be further appreciated, the major advantages of using the method described are that the noise field, High Frequency, and Low Frequency components can be generated off line. A random example can be applied at run time of this previously generated signal. This entire method reduces the computation time of the active processing by several orders of magnitude.

By example and not by way of limitation, the methodology of the invention can be expanded to include the processing requirements for bi-static and multi-static transmissions. This method greatly reduces the reverberation calculation effects for these active processing techniques.

What is claimed is:

1. A method in a data processing system for simulating a realistic sounding active sonar signal that originates from a simulated sonar transmitter, the simulated sonar signal being acted upon and modified by simulated ocean effects and then being received by a simulated hydrophone, the sonar signal being acoustically displayed within a simulated ocean acoustic environment that further incorporates realistic sounding simulated reverberation comprising:
   a. creating an ocean physical data file for storing ocean physical data;
   b. creating a noise file for storing the acoustic signatures of the ocean environment;
   c. retrieving random samples from the noise file;
   d. filtering the random samples retrieved finn the noise file;
   e. retrieving physical data from the ocean physical data file for calculating reverberation;
   f. calculating reverberation decay using inputs from the physical data file;
   g. modifying the random samples retrieved from the noise file with the calculated reverberation decay;
   h. mixing the modified random samples to create a reverberation emulation signal;
   i. defining distance data, velocity data, aspect pattern data and strength data for contacts of interest;
   j. defining data for sonar platform location and velocity;
   k. selecting a base signal frequency;
   l. selecting a sonar transmission frequency;
   m. initiating a simulated transmission of a sonar transmission signal at the sonar transmission frequency;
   n. calculating a doppler shift for the contacts at the sonar transmission frequency using inputs of the data for the contacts of interest and the data for sonar platform, location and velocity;
   o. correcting the base signal frequency for the doppler shift;
   p. correcting the base signal for propagation loss;
   q. calculating time of return for the base signal, the time of return being equal to the time of return of the simulated transmission signal at the sonar transmission frequency;
   r. mixing the base signal with the reverberation emulation signal; and,
   s. outputting the mixed signal.

2. The method of claim 1 wherein the noise file comprises noise from the group consisting of sea state noise, thermal noise, shaping noise and random noise.

3. The method of claim 1 wherein the noise file for storing the sound signature of the ocean environment includes a variable sea state that is contemporaneously selectable.

4. The method of claim 1 wherein the noise file is generated at a sampling rate equal to the signal-processing rate of a computer system defining the simulator.

5. The method of claim 1 wherein filtering the random samples retrieved from the noise file comprises a low frequency reverberation source, a high frequency reverberation source, a noise source and a fourth source.

6. The method of claim 5 wherein the low frequency reverberation source, the high frequency reverberation source and the the fourth source are modified by calculating reverberation decay.

7. The method of claim 5 wherein the low frequency reverberation source is between 785 Hz and 801 Hz.

8. The method of claim 5 wherein the high frequency reverberation source is between 800 Hz and 815 Hz.

9. The method of claim 5 wherein the noise source is between 650 I-h and 950 Hz.

10. The method of claim 5 wherein the fourth source is between 795 Hz and 805 Hz.

11. The method of claim 1 wherein the sonar transmission frequency is between 6.5 KHz and 9.5 KHz.

12. The method of claim 1 wherein the base signal is between 600 Hz and 1000 Hz.

13. The method of claim 1 wherein the base signal is equal to 800 Hz.

14. The method of claim 1 wherein the transmission signal and the base signal are the same time duration.

15. The method of claim 1 wherein the reverberation decay is calculated using a quadrature decay algorithm.

16. The method of claim 1 wherein correcting the base signal for propagation loss comprises corrections for signal strength decay.

17. The method of claim 1 wherein the reverberation decay is calculated from data comprising bottom depth and sea mount depth.

18. The method of claim 1 wherein outputting the mixed signal is to a video game scenario.

19. A data processing system for simulating reverberation in a section of an ocean comprising:
   a. a computer having a means for calculating reverberation quadrature decay;
   b. an output device comprising a speaker for receiving output from the computer, and
   c. a means for producing a simulated reverberation signal having, a noise value from 650 to 950 Hz, a fourth source between 795 Hz and 805 Hz, a low frequency reverberation source set of components between 785 to 800 Hz, and a hi frequency reverberation Source of components between 800 and 815 Hz.

20. The data processing system of claim 19 further comprising:
   a. a means for defining distance data and velocity data for simulated contacts of interest;
   b. a means for defining data for a simulated sonar platform location and velocity;
   c. a means for simulating an active sonar signal having doppler correction, the sonar signal originating from the simulated sonar platform; and
   d. a means for mixing the active sonar signal and the reverberation signal for providing active sonar simulation.

21. The data processing system of claim 20 wherein the means for mixing the active sonar signal and the reverberation signal includes a further means for calculating the time of return to the sonar platform and a means for correcting the sonar signal for propagation loss.

* * * * *